Dec. 29, 1970 W. B. ZELINA 3,551,845

TRANSISTOR-MAGNETIC OSCILLATORS INCORPORATING VOLTAGE REFERENCE MEANS TO REGULATE THE OUTPUT FREQUENCY

Filed May 9, 1968

INVENTOR.
WILLIAM B. ZELINA
BY Joseph V. Olaeys
HIS ATTORNEY.

United States Patent Office 3,551,845

Patented Dec. 29, 1970

3,551,845

TRANSISTOR-MAGNETIC OSCILLATORS INCORPORATING VOLTAGE REFERENCE MEANS TO REGULATE THE OUTPUT FREQUENCY

William B. Zelina, Erie, Pa., assignor to General Systems, Inc., Erie, Pa., a corporation of Pennsylvania Filed May 9, 1968, Ser. No. 727,938
Int. Cl. H02m 7/52
U.S. Cl. 331—113 15 Claims

ABSTRACT OF THE DISCLOSURE

An oscillator circuit of the transistor-magnetic type wherein the effect on output frequency due to fluctuations in the supply voltage is minimized by connecting the transformer for operation as a current transformer for the transistor collector current, limiting the magnitude of such collector current and providing a voltage reference against which the feed-back winding of the transformer operates to thereby set the rate of change of flux in the transformer core and establish a nearly constant switching cycle for the transistors.

This invention relates generally to transistor oscillator circuits and more particularly to arrangements whereby the effect of fluctuations in the supply voltage on the output frequency of the oscillator may be minimized.

Transistor oscillators are usually subject to wide variations in output frequency due to changes in the input voltage. A wide variety of regulation and control means are known in the art to effect a measure of control of the output frequency and/or voltage of such transistor oscillators. Many of the known circuits for effecting such regulation are complicated and expensive so that there has been a continuing need for improvement in providing a simple and inexpensive transistor oscillator circuit which would have a relatively constant output frequency in spite of variations in the supply voltage. That is, an oscillator circuit wherein the effect on the output frequency to variations in the input voltage are minimized.

It is a primary object of this invention, therefore, to provide a simple and inexpensive transistor oscillator circuit arrangement wherein the frequency of the output can be maintained nearly constant under varying conditions of the supply voltage.

Another object of the invention is to provide an arrangement for setting the rate of change of flux in the core of a transistor oscillator of the type which relies on the saturation of the core for termination of one-half of the cycle and commencement of the other half of the cycle whereby a nearly constant switching cycle is achieved, and hence a nearly constant output frequency, in spite of variations in the supply voltage.

Briefly stated, in accordance with one aspect of this invention, a transistor oscillator circuit comprises a pair of transistor devices connected in push-pull relationship with a saturable core transformer, having first and second (feed-back) windings, so that saturation of the core terminates one-half of the cycle and commences the other half cycle. In accordance with this invention the transformer is connected to function as a current transformer for the current which energizes the first winding. Voltage reference means are provided and connected so that the feed-back winding of the transformer operate against such voltage reference to thereby set the rate of change of flux in the core and consequently the switching cycle of the transistor devices.

The novel features believed characteristics of the invention are set forth with particularity in the appended claims. The invention itself, however, both as to its organization and method of operation, together with further objects and advantages thereof, may best be understood by reference to the following description taken in conjunction with the accompanying drawing wherein like reference numerals have been used to designate like or similar components and in which:

In the particular arrangements shown and described herein the transistor devices are of the P-N-P type, however, by proper reversal of polarities of the potentials connected to the various electrodes, N-P-N transistors may be used equally as well, as is well known. Also the D.C. voltage supply has been represented as a battery although it will be understood that any other source of direct current may likewise be used, such as for example, a rectifier operating from the usual commercial 115–120 volt, 60 cycle alternating current supply.

Figure 1:
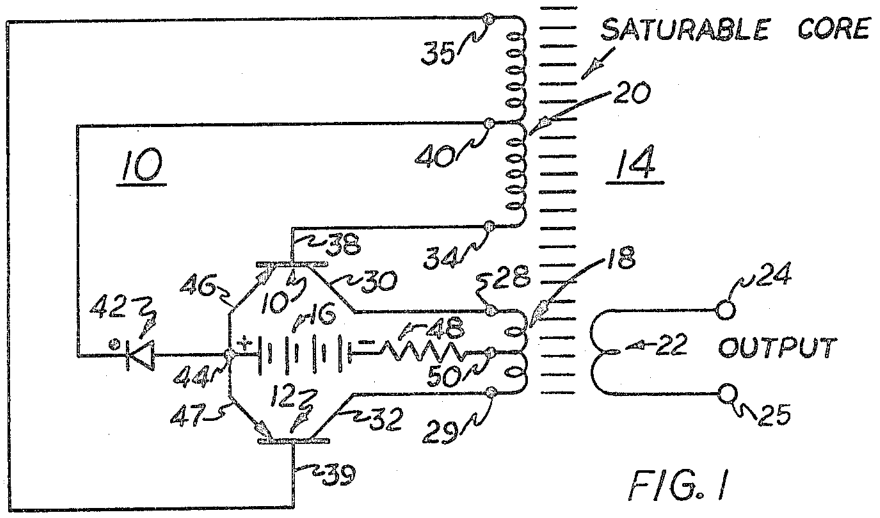
FIG. 1 is a schematic circuit diagram of one embodiment of the invention.

Referring now to the drawing, there is shown in FIG. 1 a transistor-magnetic oscillator circuit 10 in accordance with one embodiment of the invention. Conventionally, transistor oscillators of the transistor-magnetic type include a pair of switching transistors 10 and 12 and a saturating core transformer 14. A D.C. voltage supply 16 is switched with alternating polarity across a first winding 18 of the saturable core transformer by the transistors. A second, or feed-back, winding 20 on the saturable core transformer, in inductive relation with the first winding, is arranged to apply voltages induced in such second winding to each of the transistors 10 and 12 with polarities effective to establish opposing operatng conditions of the transistors. The transistors thus transfer from one to the other of their operating conditions (saturated or cut-off) in response to voltage induced in the second winding of the transformer core. An output may be taken by means of a third winding 22 of the transformer. Accordingly, there is produced at the output terminals 24 and 25 of winding 22 a substantially rectangular wave pattern whose half cycle period is proportional to the time required for the transformer core to become magnetically saturated after each reversal of the conduciing conditions of the transistors.

Figure 2:
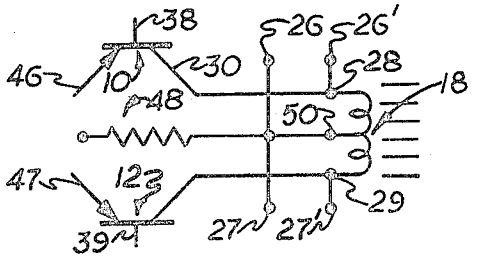
FIG. 2 illustrates an alternative means of extracting an output from the circuit.

Alternatively, first and second output means may be connected so as to be energized and de-energized in accordance with the conducting conditions of the transistors. For example, when the oscillator is employed as a timing means in a control system it may be desirable to dispense with the third winding 22 and connect instead a first output means across the upper portion of first winding 18 and a second output means across the lower portion thereof. In such an arrangement the first and second output means are alternatively transferred between energized and de-energized conditions in correspondence with the operating conditions of the associated transistors. A suitable arrangement of this type is shown in FIG. 2 as shown, the first output means has a pair of output terminals 26–26' and the second output means has a pair of output terminals 27–27'.

The organization so far described is conventional and, since the frequency of saturation of the transformer core is basically dependent upon the frequency of transfer of the operating conditions of the transistors, which is in turn dependent upon the magnitude of the D.C. voltage supply, the output frequency will vary as a direct function of the input voltage.

In accordance with this invention, however, variations in the output frequency due to fluctuations in the D.C. voltage supply 16 are minimized by providing means for setting the rate of change of flux in the core of the transformer. Briefly, this is accomplished by connecting the transformer for operation as a current transformer for the transistor collector current and providing a voltage reference against which the feed-back winding (winding 20) operates. Conveniently, the desired voltage reference may be provided by the barrier voltage drop of one or more semiconductor devices, such as for example a breakover device, a semiconductor diode, a combination of such a diode and the barrier voltage of one of the P-N junctions of a transistor, or any other suitable arrangement.

Referring again to FIG. 1, the terminals 28 and 29 of first winding 18 are connected respectively to the collector electrodes 30 and 32 of the transistors 10 and 12. The terminals 34 and 35 of the second winding 20 are connected respectively to the base electrodes 38 and 39 of the transistors 10 and 12. A center tap terminal 40 of second winding 20 is connected through voltage reference means 42, shown as a Zener diode, to the common junction 44 between the emitter electrodes 46 and 47 of the transistors 10 and 12. Junction 44 is in turn connected with the positive terminal of the D.C. voltage supply 16. The negative terminal of D.C. voltage supply 16 is connected through a suitable current limiting resistance means 48 to a center-tap terminal 50 of first winding 18. Current limiting resistance 48 operates to provide that the current in winding 18 will not exceed a desired magnitude.

As indicated, transformer 14 is connected to function as a current transformer for the transistor collector current. It follows, therefore, that the transformer must be provided with a greater number of turns in winding 20 than in winding 18. For any given arrangement using a specific core material and type transistor, the design criteria for determining the required ratio of turns of the second to the first winding is so well known that no difficulty would be encountered in arriving at a suitable ratio. No rigid turns ratio can be specified which can be generally applied, however, since the turns ratio selected must take into account such factors as the core material and the gain of the transistors, for example.

The turns ratio should be selected so that the current in winding 20 will assure that one transistor will be in a saturated condition and the other transistor will be in a cut-off condition. Since for all practical purposes the exciting current for the transformer core may be ignored because it will always be quite small, the simplified general requirement may be expressed by the following relationship:

$$\frac{N_{20}}{N_{18}}=H_{fe}$$

where $N_{20}$=Number of turns in winding 20
$N_{18}$=Number of turns in winding 18
$H_{fe}$=Gain of the transistor.

With the foregoing described connection, therefore, it will be observed that the first winding 18 is connected for energization from the D.C. voltage supply through separate paths each including current limiting resistance means 48 so as to effect opposing directions of magnetization of the core of saturable transformer 14. Also, each of the paths includes a separate one of the transistor switch means. For example, the upper portion of the winding 18, between terminal 28 and the center-tap terminal 50, is connected for energization from the supply 16 through the transistor 10 whereas the lower portion of winding 18, between terminals 29 and 50, is connected for energization from supply 16 through transistor 12. Zener diode device 42 provides the desired voltage reference to set the rate of change of flux in the core of transformer 14 and resistance means 48 provides a suitable limit for the current in first winding 18.

The manner in which transistors 10 and 12 conduct in alternate sequence is well known and will therefore be described only generally herein. Assuming that, initially, transistor 10 began to conduct slightly more than transistor 12, then transistor 10 quickly becomes saturated and transistor 12 cut-off through the feed-back action of second winding 20. When transistor 10 saturates it effectively connects the D.C. voltage supply 16 between the center-tap terminal 50 and terminal 28 of first winding 18 thereby causing current to flow from emitter electrode 46 to collector electrode 30, through the upper portion of first winding 18 and back to the supply 16. This creates a potential in second winding 20 so as to cause transistor 10 to continue to conduct and transistor 12 to remain cut-off. Current will continue to flow in this manner only until the core of transformer 14 becomes saturated.

If the core is constructed of material having a substantially rectangular hysteresis loop, core saturation will be abrupt. As is well known, the use of rectangular hysteresis loop characteristic material for the core is often preferred, and sometimes required, to provide an arrangement where the power loss in the transistors will be low and hence the circuit efficiency will be good. This is because with the rectangular hysteresis loop characteristic material saturation takes place very abruptly so that the transistors are rapidly transferred between their saturated and cut-off operating conditions. It is to be understood, however, that the advantages of frequency stability provided by the present invention will be realized as well with a core constructed of material exhibiting conventional hysteresis loop characteristics as with one exhibiting rectangular hysteresis loop characteristics.

Once the core reaches saturation it is unable to support additional voltage, thus causing the magnetic flux created by the abovedescribed flow of current to collapse and, in turn, causing the voltage appearing across second winding 20 to reverse. This reversal of voltage in second winding 20 drives transistor 10 toward cut off and transistor 12 toward saturation. When transistor 12 becomes saturated, it effectively connects the D.C. supply 16 between the center-tap terminal 50 and terminal 29 of first winding 18 thereby causing current to flow from such supply through emitter electrode 47 and collector electrode 32, the lower portion of first winding 18 and back to the supply. This, in turn, causes the potential appearing across the second winding 20 to be such as to sustain conduction in transistor 12 and cut-off in transistor 10. This current will continue to flow in the lower portion of winding 18 until the core of transformer 14 becomes saturated in the reverse direction thus causing the operation conditions of transistors 10 and 12 to reverse. This process continues and there is produced at the output terminals 24 and 25 of the third winding 22, a substantially rectangular wave pattern whose half-cycle period is proportional to the time required for the core of transformer 14 to become magnetically saturated after each reversal of the operating conditions of the transistors.

The voltage induced in second winding 20 as a result of the current in winding 18 may be expressed as follows:

$$E=N_{20}\frac{d\phi}{dt}$$

where

E=Magnitude of the voltage induced in second winding 20
$N_{20}$=Number of turns in winding 20
$d\phi/dt$=The rate of change of flux in the transformer core.

In accordance with the present invention a voltage reference is provided against which the second winding 20 must operate. This voltage reference effectively maintains the magnitude of the voltage E nearly constant in spite of fluctuations in the magnitude of D.C. voltage supply 16. Since for any given arrangement, the number of turns of winding 20 must also remain constant, it follows that the rate of change of flux in the transformer core must also be maintained nearly constant. Moreover, since the magnitude of the flux change in the core is also fixed (between saturation in one direction and saturation in the reverse direction) it follows that the time for the flux in the core to be driven from saturation in one direction to saturation in the reverse direction must also be maintained nearly constant.

Accordingly, there is provided by the present invention a transistor-magnetic oscillator wherein the switching cycle of the transistors does not change appreciably with fluctuations in the magnitude of the D.C. voltage supply and, since the half cycle period of the oscillator output is proportional to the time required for the transformer core to become magnetically saturated after each reversal of the conducting conditions of the transistors, the effect on the oscillator output frequency due to fluctuations in the D.C. voltage supply is minimized.

For example, in a conventional transistor-magnetic oscillator circuit a 10% change in the magnitude of the D.C. voltage supply will generally result in about a 10% change in the output frequency of the oscillator. In one particular transistor oscillator circuit constructed in accordance with the teachings of this invention, however, a 10% change in the magnitude of the D.C. voltage supply resulted in less than a 2% change in the output frequency. By appropriate selection of circuit parameters, such as core material, transistor devices etc., a still better regulated output may be achieved when desired.

Accordingly, in the arrangements of this invention, wherein the transformer is selected and connected for operation as a current transformer for the transistor collector current, and with the second or feed-back winding 20 thereof operating against a suitable voltage reference, variations in the feedback voltage due to fluctuations in the magnitude of the D.C. voltage supply are very significantly minimized. Consequently, fluctuations in the output frequency are similarly minimized.

Figure 3:
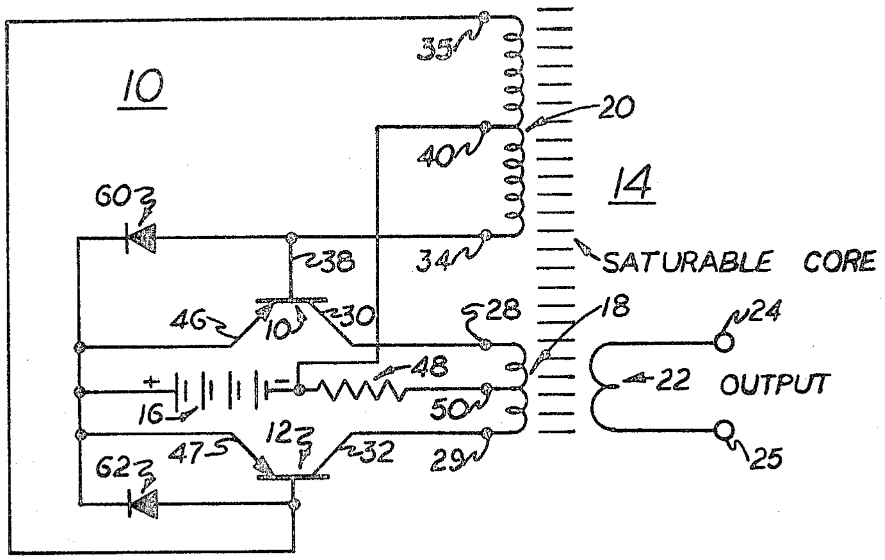
FIG. 3 is a schematic circuit diagram of another embodiment of the invention.

In FIG. 3 there is shown another embodiment of the invention. The circuit organization is similar to that shown in FIG. 1 except that the voltage reference against which the transformer feed-back winding 20 operates is implemented by the use of two diode devices 60 and 62 connected between the base to emitter electrodes of the respective transistors 10 and 12. In this arrangement the voltage reference for setting the rate of change of flux in one direction is provided by the sum of the emitter-base barrier voltage of transistor 10 and the barrier voltage of diode 62. Similarly, the voltage reference for setting the rate of change of flux in the core in the reverse direction is provided by the sum of the emitter-base barrier voltage of transistor 12 and the barrier voltage of diode 60. Since the rate of change of flux in the core is set at a substantially constant value in spite of variations in the magnitude of D.C. voltage supply 16, a substantially constant switching cycle is provided for the transistors. Accordingly, the output frequency will be substantially constant.

While only preferred embodiments of the invention have been described by way of illustration, many changes and modifications will occur to those skilled in the art. It is intended that the appended claims, therefore, cover all such changes and modifications as fall within the true spirit and scope of the invention.

What I claim as new and desire to secure by Letters Patent of the United States is:

1. An electrical system comprising:

(A) first and second switch means having an effective open and closed operating condition;

(B) a saturable core transformer having first and second windings in inductive relationship to each other, said second winding having a greater number of turns than said first winding and said transformer being connected in circuit with said switch means so as to function as a current transformer for the current controlled by said switch means;

(C) means connecting said first winding for energization from a D.C. voltage supply through separate electrical paths, each electrical path including a separate one of said switch means;

(D) means for limiting the maximum current in said electrical paths; and (E) control means for controlling operation of said switch means, said control means including said second winding and voltage reference means connected in circuit relationship with said switch means in a separate control circuit that is independent of variations in the D.C. voltage supply and being effective in response to saturation of said core to reverse the operating conditions of said switch means, each of said switch means being arranged so as to transfer from one to the other of said operating conditions upon each occurrence of saturation of said core and said voltage reference means being effective to set the rate of change of flux in said core to thereby set the switching cycle of said switch means.

2. The electrical system recited in claim 1 wherein said first and second switch means are transistor devices and said transformer is connected as a current transformer for the transistor collector current.

3. The electrical system recited in claim 1 wherein said voltage reference means includes a semiconductor device.

4. The electrical system recited in claim 2 wherein said voltage reference means includes a semiconductor device.

5. The electrical system recited in claim 3 wherein said semiconductor device is a breakover device.

6. The electrical system recited in claim 3 wherein said semiconductor device is a P-N junction diode.

7. The electrical system recited in claim 4 wherein said semiconductor device is a breakover device.

8. The electrical system recited in claim 4 wherein said semiconductor device is a P-N junction diode.

9. A transistor oscillator circuit comprising:

(A) first and second transistors each having emitter, collector and base electrodes;

(B) a saturable core transformer having first and second windings in inductive relationship with respect to each other and wherein said second winding has a greater number of turns than said first winding;

(C) a voltage source connected through current limiting means between the emitter electrodes and a center-tap on said first windings;

(D) means connecting said first winding between said collector electrodes and said second winding between said base electrodes so that said transformer operates as a current transformer for the transistor collector current;

(E) and voltage reference means connected in circuit with said second winding and the base-emitters of said first and second transistors and independent of voltage variations of said voltage source, said voltage reference means being operative to set the rate of change of flux in the core of said transformer so that said transistors exhibit a nearly constant switching cycle in spite of fluctuations in the magnitude of said voltage source.

10. The transistor oscillator circuit recited in claim 9 wherein said voltage reference means includes a semiconductor P-N junction device.

11. The transistor oscillator circuit recited in claim 10 wherein said P-N junction semiconductor device is a breakover device.

12. The transistor oscillator circuit recited in claim 10 wherein said semiconductor P-N junction device is a diode.

13. The transistor oscillator circuit recited in claim 9 wherein said voltage reference means comprises a pair of semiconductor P-N junction diodes one connected between the base and emitter electrodes of each of said transistors and being poled so that emitter-base current in one transistor flows through said second winding and the diode associated with the other transistor whereby the voltage reference is provided by the sum of the barrier voltage drops of a P-N junction diode and the emitter-base junction of a transistor.

14. The electrical system recited in claim 1 wherein a first output if extracted across a first half of said first winding and a second output is extracted across a second half of said first winding.

15. The transistor oscillator circuit recited in claim 9 wherein said voltage reference means comprises a pair of semiconductor P-N junction diodes one connected between the base and emitter electrodes of each of said transistors and being poled so that emitter-base current in one transistor flows through said second winding and the diode associated with the other transistor whereby the voltage reference is provided by the sum of the barrier voltage drops of a P-N junction diode and the emitter-base junction of a transistor.

References Cited

UNITED STATES PATENTS 3,252,107 5/1966 Martin ------------ 331—113.1

OTHER REFERENCES

QST, R.P. Johnson, "High-Power Transistorized Mobile Power Supply," pp. 11, 12, April 1958.

JOHN KOMINSKI, Primary Examiner

U.S. Cl. X.R.

321—2